Oct. 22, 1929.   A. BRILL   1,732,671
SOLID VEHICLE TIRE AND SIMILAR ARTICLE
Filed Dec. 28, 1926
Fig. 1
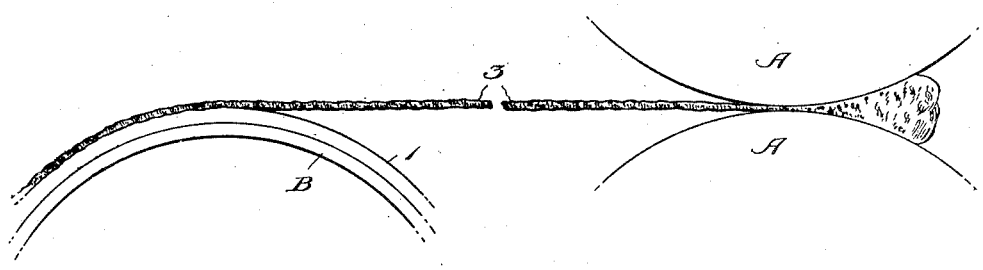
Fig. 2
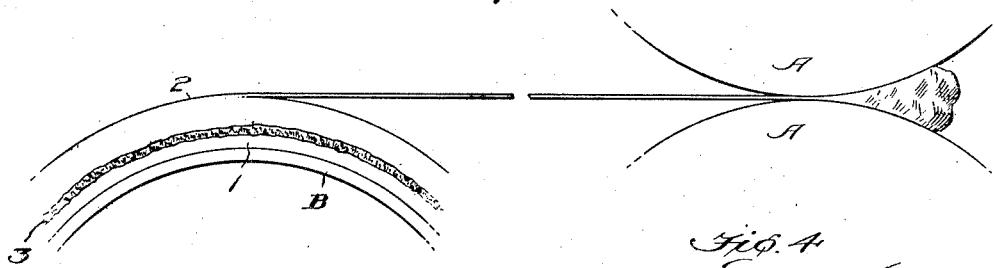
Fig. 4
Fig. 3
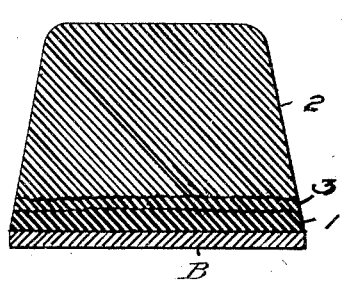
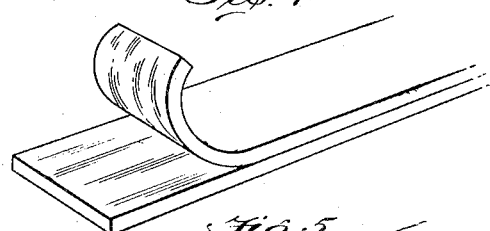
Fig. 5
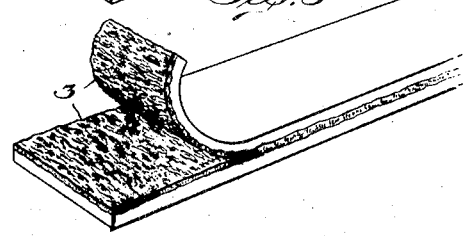
Witness
Edwin L. Bradford
Inventor
Abraham Brill
By Wm. E. Dyne
his Attorney Patented Oct. 22, 1929

1,732,671

UNITED STATES PATENT OFFICE

ABRAHAM BRILL, OF YOUNGSTOWN, OHIO, ASSIGNOR TO THE REPUBLIC RUBBER COMPANY, OF YOUNGSTOWN, OHIO, A CORPORATION OF OHIO

SOLID VEHICLE TIRE AND SIMILAR ARTICLE

Application filed December 28, 1926. Serial No. 157,596.

The present invention relates to a novel and improved article of manufacture, and more particularly to an article comprising a plurality of layers of rubber united by agency of an interposed layer of a special kind of rubber, as will be hereinafter more particularly described.

One of the objects of the invention is to provide a novel bonding medium for the uniting of rubber stocks of dissimilar character to form a substantially unitary body, as typified by solid rubber vehicle tires and rubber covered metal mill rolls.

The present application for Letters Patent is in part a continuation of my application Serial No. 136,197, filed in the United States Patent Office on September 17, 1926, for this same product, which will hereinafter be more fully set forth and finally claimed.

In the accompanying drawings which form part of this application for Letters-Patent, and whereon corresponding reference characters indicate like parts in the several illustrations:

Figure 1 is a diagrammatic fragmentary representation of a pair of calender rolls commonly employed in rubber factories, and particularly those factories engaged in the manufacture of automobile tires, showing also the first step of one approved method of producing the present product;

Figure 2 is a view corresponding with Figure 1, but exemplifying the second step in the present method of making truck tires;

Figure 3 is a sectional view taken transversely through a solid truck tire and is illustrative of the third step in the present method;

Figure 4 is a perspective view of two relatively narrow and thin strips of dissimilar rubber stocks as ordinarily bonded to build solid truck tires; and Figure 5 is also a perspective view, corresponding with Figure 4, except that the rubber strips in this instance have been united by agency of the novel means disclosed herein.

Reference being had to the drawings, the letters and numerals thereon, A represents diagrammatically, a pair of ordinary driven calendering rolls such as employed in rubber factories generally, and the letter B, wherever used, indicates the annular metal base or wheel-rim, ordinarily employed in the manufacture of truck tires.

The method described below is applicable to any product in which two dissimilar rubbers are required to be combined with a union which will not readily separate. Two outstanding examples of such a product are rubber covered steel rolls such as used for paper mill work, etc., and truck tires.

In the building of solid rubber truck tires, the common practice is, first, to put on the steel band a layer of rubber which will cure hard on vulcanization and on this there is placed the soft curing tread rubber. This is either put on by plying from the calender or by applying a tread, which has been previously run to size and shape from a tube machine.

Where a rubber stock is run on the calender, there is produced, as is well known, a distinct grain in the direction of the run. The same effect is produced on the outside depths of a tubed slab, due to the drag of the die face on the stock. This grain effect, which exists in the unvulcanized stock persists in the vulcanized rubber. When a calendered layer of tread rubber is vulcanized to a layer of rubber which will vulcanize hard under the vulcanizing conditions, this grain effect is accentuated to the extent that distinct cleavage planes are formed in the tread rubber. When the tread is forcibly torn from the hard rubber, the separation is either at the junction of the two rubbers or the tread rubber tears in a plane parallel to the junction, that is, in the direction of the calendered grain. The probable explanation for this accentuation of cleavage is that some of the sulphur migrates from the hard rubber to the softer rubber, (that is the one containing lower surphur) forming strata of over-vulcanized weak rubber, which strata run parallel with the calendered grain.

I have found that this grain effect with the resulting cleavage planes set up can be overcome by interposing between these dissimilar rubbers a layer of specially creped rubber. In calendering rubber, the ordinary procedure is to first thoroughly plasticize the rubber on a warming mill and then run it through a calender which produces a smooth even gauge sheet of rubber. When the rubber is not plasticized on the warming mill it will come out from the calender with a very rough surface similar in appearance to crepe. In the first case, where the rubber is highly plasticized it takes a pronounced grain effect. Where it is not so plasticized and a crepe is produced, there is no distinct grain produced. When such crepe is interposed between two dissimilar rubbers, as described, there is no cleavage plane produced. The tread rubber when pulled from the hard rubber will not split in regular cleavage planes but tears in a jagged manner with a very great increase in the pull required to cause separation.

I have found that in every case where comparisons are made between a crepe rubber tie and a smooth calendered tie of the same composition, the crepe shows very much higher pull required to cause separation.

In the construction of elastic truck tires rubber stocks of dissimilar physical characteristics are employed, because of the necessity of using next to the metal base or wheel-rim a base rubber so compounded that it will become very hard when vulcanized, and next to this base a rubber stock so compounded that it will remain relatively soft and yielding for tread purposes, after vulcanization.

A primary object of the present invention therefore is to firmly unite the base and tread portions aforesaid, by agency of an interposed tie gum or rubber, and by a novel method of applying the same.

According to one approved method of producing the novel structure which forms the subject of this invention, I proceed substantially as follows:

Plasticized rubber from an ordinary warming mill (not shown) is run through calendering rolls A, A, and wound thence directly upon a metal base or wheel-rim B, positioned and rotatably mounted to receive it. The rubber stock thus first applied to the metal base B, eventually becomes the hard rubber tire-base shown at 1, Figures 1, 2 and 3, as is well understood by persons skilled in the art to which this invention relates, possesses a distinct grain extending longitudinally or in the direction of the run of the rolls.

Heretofore it has been customary to next apply to the tire base 1 aforesaid, directly from the calendering rolls A, A, laminations of plasticized uncured tread rubber 2, so compounded that it will remain soft and pliable after vulcanization. Or, in some instances the entire tread 2 is first run to the required size and shape from a tube machine, is then applied directly over the tire base 1, and secured to the latter during vulcanization.

If built up from strips of plasticized rubber fed directly from the calendering rolls, the grain as aforesaid is produced by the run of the rolls, and exists throughout the entire laminated tread. On the other hand, if the tread 2 is produced in slab form by agency of a tube machine, and then superimposed upon the tire base 1, there is still a distinct grain produced, but only adjacent the exterior surfaces of the slab, due to the drag of the die face on the stock.

In either case, however, when the plasticized tread rubber 2 is applied to the plasticized base rubber 1, and united by vulcanization, this grain effect is accentuated to the extent that distinct cleavage planes are produced, and if the former is then forcibly torn from the latter, as indicated by Figure 4, the separation will be either at the junction of the two, or the tread rubber tears in a plane parallel to the junction, that is to say in the direction of the calendered grain running longitudinally therethrough similar to that of straight-grained wood, but, of course, not so pronounced in appearance.

As a means therefore of eliminating the grain effect with its resulting cleavage planes as aforesaid, and of insuring a more nearly perfect, indestructible bond between the bases 1 and treads 2 of truck and other tires, my present method provides as its next or second step following application of the base 1, that of interposing between said bases and treads a grainless tie gum 3 of unplasticized rubber, or in other words, creped rubber which has not been subjected to the action of a warming mill.

This unplasticized, so-called crepe rubber presents a very rough appearance, and is devoid of any distinct grain, but in applying same to the exterior surface of the tire base 1, is run through the calender rolls A, A, as shown by Figure 1, and is thence plied directly upon the base layers 1 of the tire in course of construction, to a sufficient depth or thickness.

This accomplished, the tread rubber, suitably compounded and highly plasticized, is next wound from the calender around the tie gum or crepe rubber 3, as shown by Figures 2 and 3, whereupon the composite structure is finally placed in a suitable mold, and vulcanized in the usual and well understood manner.

Thus it will be noted that there are no distinct cleavage planes produced between the dissimilar rubber stocks of which the tire-base and the tire-tread respectively, are formed, provided my improved method is followed, including the use, substantially as above described, of unplasticized tie-rubber in forming a bond between the two. If under these conditions great force is applied, as diagrammatically indicated by Figure 5, to separate dissimilar rubber stocks which have first been bonded together in accordance with the foregoing description of my present invention, it will be found that the separation will not be in regular cleavage planes, but rather, as indicated, in a very jagged, irregular manner, which demonstrates a normal interlocked relation of adjacent parts.

Having thus described my invention what I now claim and desire to secure by Letters Patent is:

1. An article of manufacture formed from a plurality of rubber sections connected by agency of unplasticized rubber.

2. An article of manufacture formed from a plurality of rubber sections of dissimilar character, connected by a bond of unplasticized rubber.

3. An article of manufacture formed of layers of rubber stock of dissimilar character, and an interposed layer of crepe rubber for bonding the whole together by vulcanization.

4. An article of manufacture comprising a metal base, a plurality of rubber sections surmounting said base, and a bonding section of unplasticized rubber interposed between the rubber sections aforesaid.

5. An elastic tire formed of a base section, a tread section, and an intermediate section of unplasticized grainless rubber.

6. An elastic tire formed of base, tread, and intermediate sections, the latter of unplasticized rubber, vulcanized into one unitary structure.

In testimony whereof I affix my signature.

ABRAHAM BRILL.